US011059942B2

(12) United States Patent
Miller et al.

(10) Patent No.: US 11,059,942 B2
(45) Date of Patent: Jul. 13, 2021

(54) AROMATIC POLYESTERS FROM BIOSUCCINIC ACID

(71) Applicant: UNIVERSITY OF FLORIDA RESEARCH FOUNDATION, INCORPORATED, Gainesville, FL (US)

(72) Inventors: Stephen Albert Miller, Gainesville, FL (US); Ha Thi Hoang Nguyen, Amherst, NY (US); Gabriel Nicholas Short, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 28 days.

(21) Appl. No.: 16/547,162

(22) Filed: Aug. 21, 2019

(65) Prior Publication Data

US 2020/0062895 A1 Feb. 27, 2020

Related U.S. Application Data

(60) Provisional application No. 62/720,496, filed on Aug. 21, 2018.

(51) Int. Cl.
*C08G 63/672* (2006.01)
*C08G 63/183* (2006.01)

(52) U.S. Cl.
CPC ......... *C08G 63/672* (2013.01); *C08G 63/183* (2013.01)

(58) Field of Classification Search
USPC .................................................... 528/308.1
See application file for complete search history.

(56) References Cited

U.S. PATENT DOCUMENTS

| 3,047,536 A | 7/1962 | Gordon |
| 3,477,989 A | 11/1969 | Zorn et al. |
| 5,674,969 A | 10/1997 | Sikkema et al. |
| 5,783,723 A | 7/1998 | Campbell et al. |
| 2015/0218730 A1 | 8/2015 | Dang et al. |

FOREIGN PATENT DOCUMENTS

| EP | 2794258 A1 | 10/2014 |
| JP | 60166320 A | 8/1985 |
| JP | 2011128407 | 6/2011 |
| WO | 2012125218 A1 | 9/2012 |
| WO | 2013092626 A1 | 6/2013 |

OTHER PUBLICATIONS

Masaki Shimizu, et al. "(Poly)terephthalates with Efficient Blue Emission in the Solid State" Chemistry an Asian Journal; Full Paper: (Year: 2018).*

Saheli Chakraborty et al. Criss-cross amphiphilic polymers and analogous model systems; Journal of Polymer Science Polymer Chemistry vol. 56, issue 14 pp. 1554-1563; May 11, 2018 (Year: 2018).*
M. Ritsuki, K. Ohmori, L. Hintermann, S. Yoshida and K. Suzuki, "First Stereoselective Total Synthesis of FD-594 Aglycon", Angew. Chem. Int. Ed., 2009, 48, 3462-3465.
Y.-F. Chen, E. M. Woo, and S.-H. Li, "Dual Types of Spherulites in Poly(octamethylene terephthalate) Confined in Thin-Film Growth", Langmuir, 2008, 24, 11880-11888.
M. G. Koehler and A. J. Hopfinger, "Molecular modelling of polymers: 5. Inclusion of intermolecular energetics in estimating glass and crystal-melt transition temperatures", Polymer, 1989, 30, 116-126.
B. Wunderlich, "Copolymer and Isomer Melting" in Macromolecular Physics Volume 3 Crystal Melting, Academic Press, New York, 1980, 10, 312-314.
Statista, "Polyethylene terephthalate (PET) production worldwide in 2014 and 2020", accessed Mar. 2018. https://www.statista.com/statistics/650191/global-polyethylene-terephthalateproduction-outlook/.
Statista, "Production of plastics worldwide from 1950 to 2016", accessed Mar. 2018. https://www.statista.com/statistics/282732/globalproduction-of-plastics-since-1950/.
S. Munoz-Guerra, C. Lavilla, C. Japu and A. Martinez de Ilarduya, "Renewable terephthalate polyesters from carbohydrate-based bicyclic monomers", Green Chemistry, 2014, 16, 1716-1739.
Rule, M. , "Physical Constants of Poly(Oxyethylene-Oxyterephthaloyl) (Poly(Ethylene Terephthalate))", Polymer Handbook, ed. J. Brandrup, E. H. Immergut, E. A. Grulke, A. Abe and D. R. Abe, John Wiley & Sons, New York, 4th ed, 2005, pp. V/113-V/118.
H. A. Schneider, "Flexibility and Phase Transitions of Polymers", J. Appl. Polym. Sci., 2003, 88, 1590-1599.
United States Government Accountability Office "Crude Oil: Uncertainty about Future Oil Supply Makes it Important to Develop a Strategy for Addressing a Peak and Decline in Oil Production" GAO-07-283, Feb. 2007, accessed Mar. 2018. http://www.gao.gov/products/GAO-07-283.
Ecotricity, "The End of Fossil Fuels", accessed Mar. 2018. https://www.ecotricity.co.uk/our-green-energy/energy-independence/the-end-offossil-fuels.
CSRWire, "The Coca-Cola Company Introduces Innovative Bottle Made From Renewable, Recyclable, Plant-Based Plastic", May 14, 2009, accessed Mar. 2018. http://www.csrwire.com/press_releases/22460-The-Coca-Cola-Company-Introduces-Innovative-Bottle-Made-From-Renewable-Recyclable-Plant-Based-Plastic.
Coca-Cola. "3 Lessons Coke Has Learned Since Launching Plant Bottle Packaging", Nov. 2, 2014, accessed Mar. 2018. http://www.cocacolacompany.com/stories/3-lessons-coke-has-learned-since-launchingplantbottle.

(Continued)

Primary Examiner — Terressa Boykin
(74) Attorney, Agent, or Firm — Timothy H. Van Dyke; Wolter Van Dyke Davis, PLLC

(57) ABSTRACT

Biosuccinic acid, obtained via sugar fermentation, is cyclodimerized and oxidized to yield building blocks for aromatic polyesters with high glass transition temperatures.

14 Claims, 5 Drawing Sheets

(56) References Cited

OTHER PUBLICATIONS

H. Ren, F. Qiao, Y. Shi, M. W. Knutzen, Z. Want, H. Du and H. Zhang, "PlantBottle™ Packaging program is continuing its journey to pursue bio-monoethylene glycol using agricultural waste", J. Renew. Sustain. Energy, 2015, 7, 041510.

M. Colonna, C. Berti, M. Fiorini, E. Binassi, M. Mazzacurati, M. Vannini and S.Karanam, "Synthesis and radiocarbon evidence of terephthalate polyesters completely prepared from renewable resources", Green Chem., 2011, 13, 2543-2548.

M. B. Banella, C. Gioia, M. Vannini, M. Colonna, A. Celli and A. Gandini, "A Sustainable Route to a Terephthalic Acid Precursor", ChemSusChem, 2016, 9, 942-945.

G. A. Kraus, S. Riley and T. Cordes, "Aromatics from pyrones: para-substituted alkyl benzoates from alkenes, coumalic acid and methyl coumalate", Green Chem., 2011, 13, 2734-2736.

C. L. Williams, C.-C. Chang, P. Do, N. Nikbin, S. Caratzoulas, D. G. Vlachos, R. F. Lobo, W. Fan and P. J. Dauenhauer, "Cycloaddition of Biomass-Derived Furans for Catalytic Production of Renewable p-Xylene", ACS Catal., 2012, 2, 935-939.

C. Vilela, A. F. Sousa, A. C. Fonseca, A. C. Serra, J. F. J. Coelho, C. S. R. Freire and A. J. D. Silvestre, "The quest for sustainable polyesters—insights into the future", Polym. Chem., 2014, 5, 3119-3141.

F. Sousa, C. Vilela, A. C. Fonseca, M. Matos, C. S. R. Freire, G.-J. M. Gruter, J. F. J. Coelho and A. J. D. Silvestre, "Biobased polyesters and other polymers from 2,5-furandicarboxylic acid: a tribute to furan excellency", Polym. Chem., 2015, 6, 5961-5989.

Avantium, YXY technology, accessed Mar. 2018. https://www.avantium.com/yxy/yxy-technology/.

L. Mialon, A. G. Pemba and S. A. Miller, "Biorenewable polyethylene terephthalate mimics derived from lignin and acetic acid", Green Chem., 2010, 12, 1704-1706.

H. T. H. Nguyen, E. R. Suda, E. M. Bradic, J. A. Hvozdovich and S. A. Miller, "Polyesters from Bio-Aromatics" in ACS Symposium Series Green Polymer Chemistry III: Biobased Materials and Biocatalysis, ed. H. N. Cheng, R. A. Gross and P. B. Smith, 2015, vol. 192, ch. 24, pp. 401-409.

L. Mialon, R. Vanderhenst, A. G. Pemba and S. A. Miller, "Polyalkylenehydroxybenzoates (PAHBs): Biorenewable Aromatic/Aliphatic Polyesters from Lignin" Macromol. Rapid Commun., 2011, 32, 1386-1392.

H. T. H. Nguyen, M. H. Reis, P. Qi and S. A. Miller, "Polyethylene ferulate (PEF) and congeners: polystyrene mimics derived from biorenewable aromatics" Green Chem., 2015, 17, 4512-4517.

F. Pion, P.-H. Ducrot and F. Allais, "Renewable Alternating Aliphatic-Aromatic Copolyesters Derived from Biobased Ferulic Acid, Diols, and Diacids: Sustainable Polymers with Tunable Thermal Properties" Macromol. Chem. Phys., 2014, 215, 431-439.

Muncke, J. "PEF: New food contact polymer on the horizon" Food Packaging Forum, Nov. 19, 2013, accessed Mar. 2018. http://www.foodpackagingforum.org/News/PEF-New-food-contact-polymer-onthe-horizon.

Bio-Based World News, Avantium and Mitsui aim to deliver PEF bottles for 2020 Olympics, Dec. 15, 2015, accessed Mar. 2018. http://www.biobasedworldnews.com/avantium-and-mitsui-aim-to-deliver-pefbottles-for-2020-olympics.

Nguyen, Ha Thi Hoang et al., "Copolymerization of lactones and bioaromatics via concurrent ring-opening polymerization/polycondensation" Green Chem., 2017, vol. 19, pp. 1877-1888.

D. Seebach, T., Hoffmann, F. N.M. Kuhnle, J. N. Kinkel and M. Schulte, "Preparation, Structure, and Properties of All Possible Cyclic Dimers (Diolides) of 3-Hydroxybutanoic Acid", Helv. Chim. Acta, 1995, 78, 1525-1540.

X. Wang, V. Ho, R. A. Segalman and D. G. Cahill, "Thermal Conductivity of High-Modulus Polymer Fibers", Macromolecules, 2013, 46, 4937-4943.

H. H. Song, T. Cho, D. P. Heberer, T. D. Dang, F. E. Arnold and L. Tan, "Poly(2,5-dihydroxy-1,4-phenylene benzobisthiazole)/Poly(1,4-phenylene benzobisthiazole) Copolymers: Chain Packing and Properties", J. Polym. Sci. Part B Polym. Phys., 2001, 39, 559-565.

T. Zhang, J. Jin, S. Yang, G. Li and J. Jiang, "UV accelerated aging and aging resistance of dihydroxy poly(p-phenylene benzobisoxazole) fibers", Polym. Adv. Technol., 2011, 22, 743-747.

J. J. Bozell and G. R. Peterson, "Technology development for the production of biobased products from biorefinery carbohydrates—the US Department of Energy's "Top 10" revisited" Green Chem, 2010, 12, 539-554.

Top Value Added Chemicals from Biomass, ed. T. Werby and G. Petersen, U.S. Department of Energy, 2004, accessed Mar. 2018. https://www.nrel.gov/docs/fy04osti/35523.pdf.

J. H. Ahn, and Y.-S. Jang S. Y. Lee, "Production of succinic acid by metabolically engineered microorganisms", Curr. Opin. Biotechnol., 2016, 42, 54-66.

J. M. Pianzo, M E. Domine, V. Parvulescu and F. Petru, "Sustainability metrics for succinic acid production:A comparison between biomass-based and petrochemical routes", Catal. Today, 2015, 239, 17-24.

C. Pateraki, M. Patsalou, A. Vlysidis, N. Kopsahelis, C. Webb, A. A. Koutinas and M. Koutinas, "Actinobacillus succinogenes: Advances on succinic acid production and prospects for development of integrated biorefineries", Biochem. Eng. J., 2016, 112, 285-303.

R. Taylor, L. Nattrass, G. Alberts, P. Robson, C. Chudziak, A. Bauen, I. M. Libelli, G. Lotti, M. Prussi, R. Nistri, D. Chiaramonti, A. L. Contreras, H. Bos, G. Eggink,J. Springer, R. Bakker and R. van Ree, From the Sugar Platform to biofuels and biochemical: Final report for the European Commission Directorate—General Energy, 2015, accessed Mar. 2018. https://ec.europa.eu/energy/sites/ener/files/documents/EC%20Sugar%20Platform%20final%20report.pdf.

Y. Zhu, C. Romain and C. K. Williams, "Sustainable polymers from renewable resources", Nature, 2016, 540, 354-362.

A. Oishi, M. Zhang, K. Nakayama, T. Masuda and Y. Taguchi, "Synthesis of Poly(butylene succinate) and Poly(ethylene succinate) Including Diglycollate Moiety", Polym. J., 2006, 38, 710-715.

H. Deter and V. Schmitt, "Acidochromism of stilbenoid chromophores with a p-aminoaniline centre", J. Phys. Org. Chem., 2006, 19, 603-607.

M. Shimizu, Y. Asai, Y. Takeda, A. Yamatani and T. Hiyama, "Twisting strategy applied to N,N-diorganoquinacridones leads to organic chromophores exhibiting efficient solid-state fluorescence", Tetrahedron Lett., 2011, 52, 4084-4089.

B. Tang, C. Want, Y. Want and H. Zhang, "Efficient Red-Emissive Organic Crystals with Amplified Spontaneous Emissions Based on a Single Benzene Framework", Angew. Chem. Int. Ed., 2017, 56, 12543-12547.

M. Strohmeier, A. M. Orendt, D. W. Alderman and D. M. Grand, "Investigation of the Polymorphs of Dimethyl-3,6-Dichloro-2,5-Dihydroxyterephthalate by 13C Solid-State NMR Spectroscopy", J. Am. Chem. Soc. 2001, 123, 1713-1722.

L. Steemers, M. J. Wanner, A. W. Ehlers, H. Heimstra and J. H. van Maarseveen, "A Short Covalent Synthesis of an All-Carbon-Ring [2]Rotaxane", Org. Lett., 2017, 19, 2342-2345.

H. Liu and Q. Wang, "Synthesis and Antimicrobial Activities of 2,5-Substituent Hydroquinone Derivatives", Asian J. Chem. 2014, 26, 5165-5167.

H. Lin, Y.-D. Huang and F. Wang, "Synthesis and Properties of Poly[p-(2,5-dihydroxy)-phenylenebenzobisoxazole] Fiber", Int. J. Mol. Sci., 2008, 9, 2159-2168.

S. Henke, A. Schneemann, S. Kapoor, R. Winter and A. Fischer, "Zinc-1,4-benzenedicarboxylate-bipyridine frameworks—linker functionalization impacts network topology during solvothermal synthesis", J. Mater Chem., 2012, 22, 909-918.

H.-L. Liu and Q.-Z. Wang, "Synthesis and Antimicrobial Activities of 2,5-Substituent Hydroquinone Derivatives", Asian J. Chem., 2014, 26, 5165-5167.

Y.-F. Liang, S. Song, L. Ai, X. Li and N. Jiao, "A highly efficient metal-free approach to metaand multiple-substituted phenols via a simple oxidation of cyclohexenones", Green Chem., 2016, 18, 6462-6467.

(56) References Cited

OTHER PUBLICATIONS

Z. Y. Chen and W. Zhang, "Oxidative aromatization of Hantzsch 1,4-dihydropyridines by aqueous hydrogen peroxide-acetic acid", Chin. Chem. Lett., 2007, 18, 1443-1446.

R. Albilali and N. Dimitratos, "Transfer Dehydrogenation of 1-Phenylethanol Over Pd/C Under Mild Conditions: Effect of Reaction Conditions and Optimization of Catalytic Performance", Catal. Lett., 2017, 147, 2372-2384.

F.S. Tjoeng and G. A. Heavner, "Synthesis of a New Photolabile Support. 4-(2-Chloropropionyl)henylacetamidomethyl-resin and its Application in Solid-Phase Peptide Synthesis", J. Org. Chem., 1983, 48, 355-359.

* cited by examiner

AROMATIC POLYESTERS FROM BIOSUCCINIC ACID

CROSS-REFERENCE TO RELATED APPLICATION

This application claims the benefit of U.S. Provisional Patent Application No. 62/720,496, filed Aug. 21, 2018, titled AROMATIC POLYESTERS FROM BIOSUCCINIC ACID, which is incorporated by reference herein in its entirety.

STATEMENT REGARDING FEDERALLY SPONSORED RESEARCH OR DEVELOPMENT

This invention was made with government support under CHE1607263 awarded by the National Science Foundation. The government has certain rights in the invention.

BACKGROUND

As one of the most important commodity plastics on the market, polyethylene terephthalate (PET) accounts for 13% of the plastics production worldwide.[1] PET has many applications which include packaging, films, and fibers, among others.[2,3] Single use beverage bottle consumption accounts for 81% of all PET packaging, corresponding to 12.5 million tons in 2013.[4] Total PET packaging usage is projected to reach 21.1 million tons by 2021.[5] PET is synthesized from ethylene glycol and terephthalic acid, both traditionally derived from fossil fuels.[2] Scheme 1 shows the structure of terephthalic acid and polyethylene terephthalate.

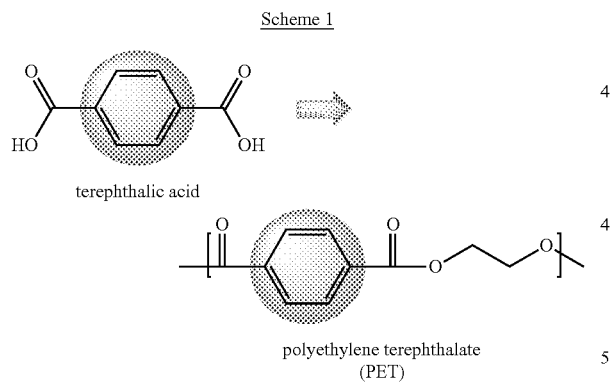

Scheme 1

PET has a glass transition temperature ($T_g$) high enough (72° C.)[6,7] for a variety of packaging applications.

Previously, the authors of the present disclosure have designed and built various PET mimics from biobased aromatic monomers. These bioaromatics were included to emulate the terephthalate component of PET, which imparts conformational rigidity and chain-chain interactions, resulting in a glass transition temperature ($T_g$) similar to the $T_g$ of PET (72° C.)[8,9] that is high enough for a variety of packaging applications.

As shown in Scheme 2, the biorenewable PET analogues may include the homopolymer polydihydroferulic acid (PHFA) with a $T_g$ of 78° C.[22,23], which may be derived from ferulic acid.

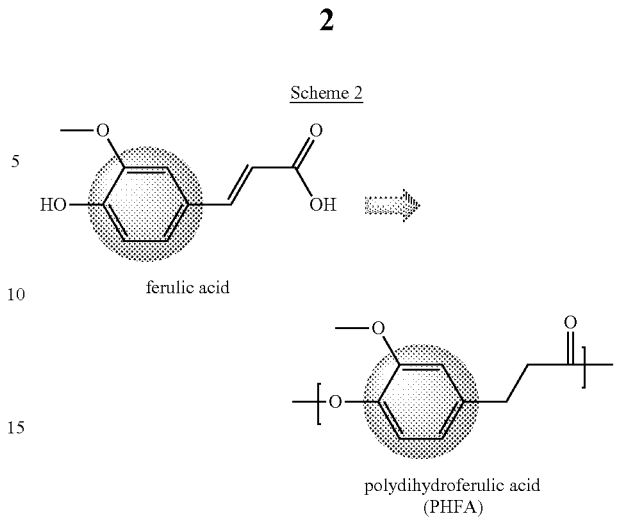

Scheme 2

As shown in Scheme 3, the biorenewable PET analogues may include polyethylene hydroxybenzoates with $T_g$ values ranging from 76 to 82° C.[24,26]. More specifically, the polyethylene hydroxybenzoates may include polyethylene hydroxybenzoate with a $T_g$ of 80° C., polyethylene vanillate with a $T_g$ of 82° C., and polyethylene syringate with a $T_g$ of 76° C.

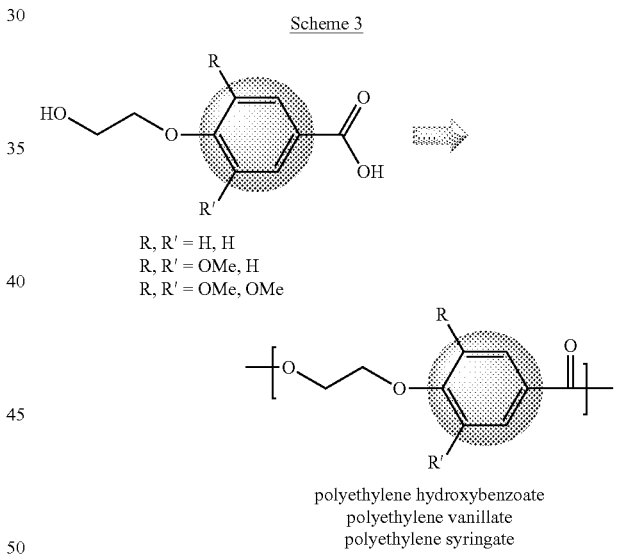

Scheme 3

As shown in Scheme 4, the biorenewable PET analogues may include polyethylene coumarate and polyethylene ferulate with $T_g$ values of 109 and 113° C., respectively[25].

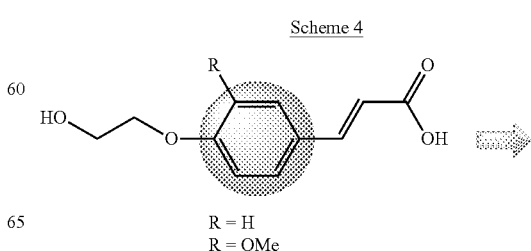

Scheme 4

-continued

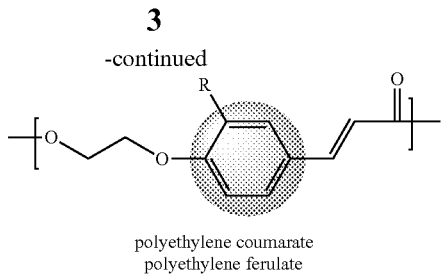

polyethylene coumarate
polyethylene ferulate

As shown in Scheme 5, the biorenewable PET analogues may include copolymers of L-lactide and bioaromatics with $T_g$ values ranging from 68 to 107° C.[26]

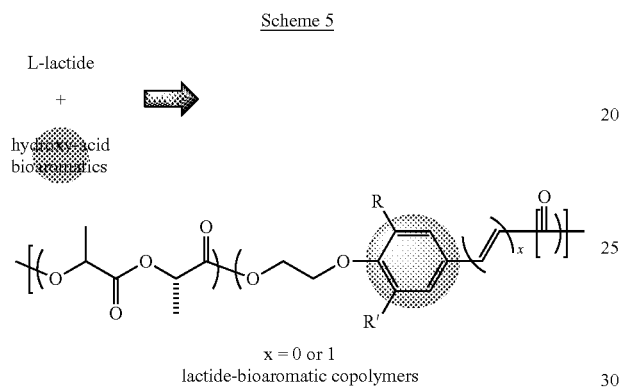

x = 0 or 1
lactide-bioaromatic copolymers

The products of Scheme 2, Scheme 3, Scheme 4, and Scheme 5 illustrate some exemplary biorenewable PET mimics produced from naturally-occurring bioaromatics that exhibit glass transition temperatures ($T_g$) competitive with fossil fuel-based PET.[9,23,24,25,26]

Spurred by a rising demand for PET and a continued depletion of fossil fuels reserves,[10,11] the Coca-Cola company launched the PET PLANTBOTTLE® in 2009.[12,13] Its 30% biobased content is achieved with bio-ethylene glycol, which derives from bioethanol.[14] The remaining 70% of PLANTBOTTLE® derives from terephthalic acid, which is still fossil fuel-based.[2]

Fully biorenewable PET or PET mimics have been targeted in a number of ways including: designing new synthetic routes for converting biomass to terephthalic acid (TA);[15,16,17,18] synthesizing alternative diacids to supplant terephthalic acid;[19,20,21] and creating novel biorenewable polyesters with properties comparable to those of PET.[22,23,24,25,26,27] Among the efforts to mimic PET, the most successful to date is arguably polyethylene furanoate (PEF), produced by Avantium.[16] Biobased PEF bottles—reportedly not biodegradable[28]—are scheduled for use in the 2020 Summer Olympics in Japan.[29]

The 1885 work of Ebert[30] first reported the Claisen condensation/Dieckmann cyclization of dimethyl succinate to afford dimethyl succinyl.[31] This cyclic dimerization product clearly resembles terephthalic acid but is still not aromatic.

Prior polymerization chemistry has employed aromatic 2,5-dihydroxyterephthalic acid (DHTA) for the synthesis of polydiimidazoles,[32,33,34] polythioles,[35,36] and polybisoxazoles.[58,37] Three patents have described the use of petroleum-based DHTA, or its dimethyl ester, in polyester or terpolyester production.[38,39,40] However, key thermal properties were absent, or the aromatic feed fraction was less than 3%; hence, imperative comparisons to the structural analogue PET have not been made. Polymers made directly from DMTA have not been described, but the copolymer of its dimethyl ester and 1,2-propanediol has been claimed in a patent.[41] However, critical characterization and thermal property analysis was not conducted.

A need remains for PET mimics from biobased aromatic monomers.

BRIEF SUMMARY

Various embodiments relate to a polymer having, made of, or made from a plurality of monomers having the structure:

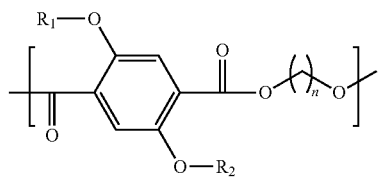

wherein n may be from 1 to 20, and wherein $R_1$ and $R_2$ may be independently selected from hydrogen or a $C_1$-$C_6$ hydrocarbon substituent.

According to various embodiments, the polymer may be a copolymer, possessing additional repeat units. According to various embodiments, the polymer may be a polyalkylene dihydroxyterephthalate, having the structure:

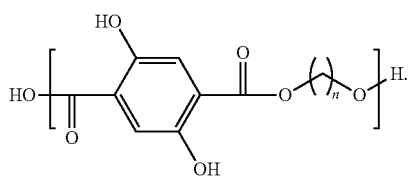

According to various embodiments, the polymer may be a polyalkylene dimethoxyterephthalate, having the structure:

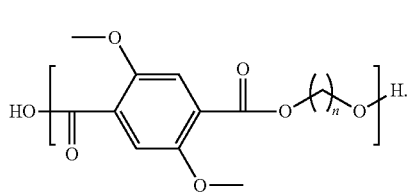

According to various embodiments, the polymer may have a number average molecular weight in a range of from about 5,000 to about 500,000. According to various embodiments, the polymer may have a weight average molecular weight in a range of from about 10,000 to about 1,000,000. According to various embodiments, the polymer may have a dispersity in a range of from about 1.1 to about 10. According to various embodiments, the polymer may have a glass transition temperature in a range of from about 5 to about 180° C.

Various embodiments relate to a method for producing a polymer, including a polymer according to other embodiments described herein. The method including esterifying succinic acid to form dimethyl succinate; dimerizing the dimethyl succinate to obtain dimethyl succinyl succinate; aromatizing the dimethyl succinyl succinate via at least one selected from N-chlorosuccinimide oxidation, sulfuric acid oxidation, dimethylsulfoxide oxidation, hydrogen peroxide oxidation, and transfer dehydrogenation to produce dimethyl 2,5-dihydroxyterephthalate; hydrolysing and optionally methylating the dimethyl 2,5-dihydroxyterephthalate to produce a monomer; and polymerizing the monomer with a comonomer comprising at least 2 hydroxyl groups to produce the polymer. According to various embodiments, the comonomer may be a linear diol having the structure:

in which n is from 1 to 20.

These and other features, aspects, and advantages of various embodiments will become better understood with reference to the following description, figures, and claims.

BRIEF DESCRIPTION OF THE FIGURES

Many aspects of this disclosure can be better understood with reference to the following figures, in which.

Figure 1:
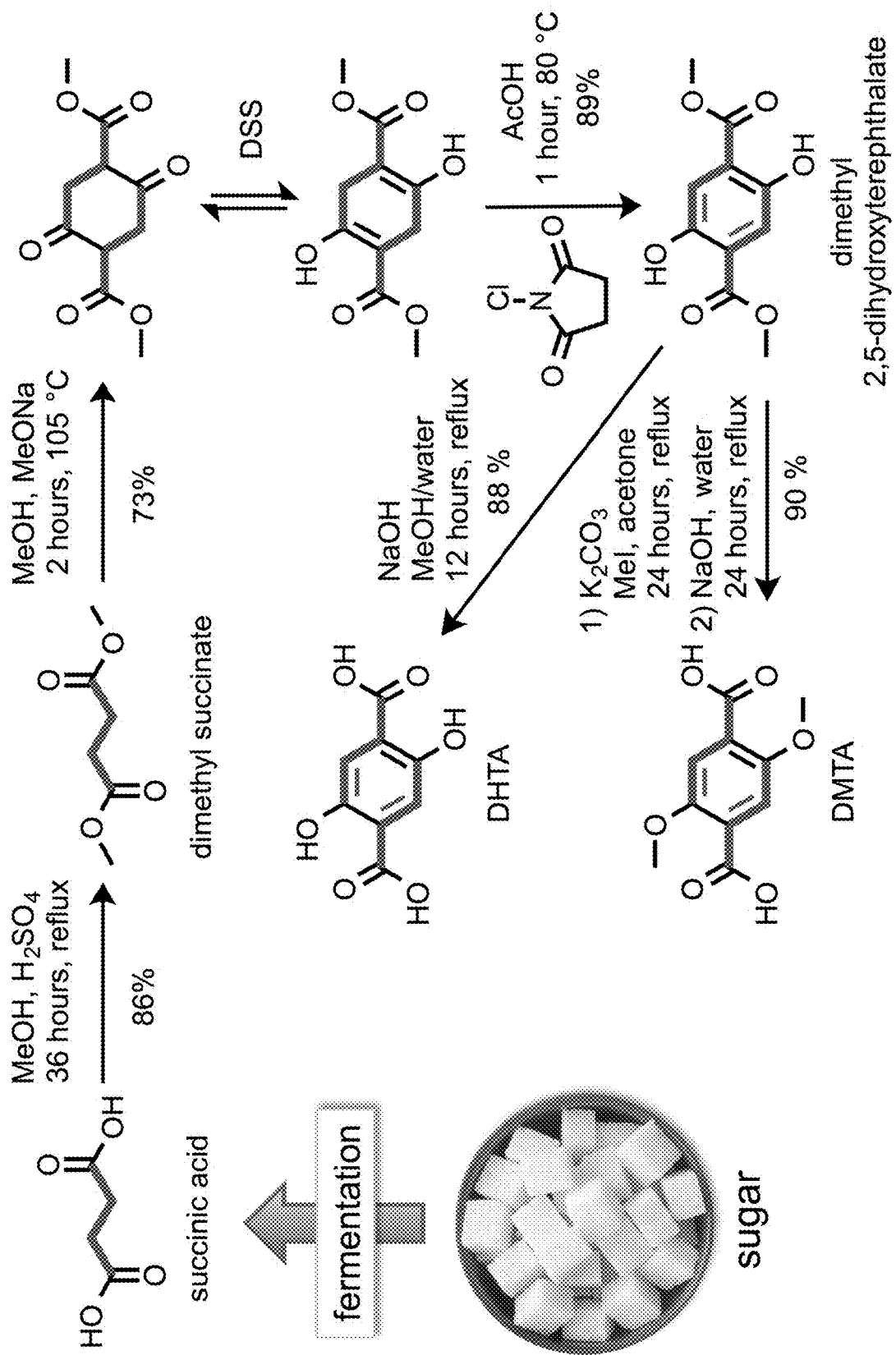
FIG. 1: is an example according to various embodiments, illustrating synthesis of aromatic 2,5-dihydroxyterephthalic acid (DHTA) and 2,5-dimethoxyterephthalic acid (DMTA) in four steps from succinic acid, which can be obtained from sugar.

It should be understood that the various embodiments are not limited to the examples illustrated in the figures.

DETAILED DESCRIPTION

Various embodiments may be understood more readily by reference to the following detailed description. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As used herein, the term "standard temperature and pressure" generally refers to 20° C. and 1 atmosphere. Standard temperature and pressure may also be referred to as "ambient conditions." Unless indicated otherwise, parts are by weight, temperature is in ° C., and pressure is at or near atmospheric. The terms "elevated temperatures" or "high-temperatures" generally refer to temperatures of at least 100° C.

The term "mol percent" or "mole percent" generally refers to the percentage that the moles of a particular component are of the total moles that are in a mixture. The sum of the mole fractions for each component in a solution is equal to 1.

As used herein, the abbreviation, "Me" refers to a methyl group and "OMe" refers to a methoxy group.

As used herein, the term "equivalent" generally refers to the amount of a substance that reacts with (or is equivalent to) an arbitrary amount of another substance in a given chemical reaction.

As used herein, the term "dimerization", "dimerized", or "dimerizing" generally refers to an addition reaction in which two molecules of the same compound react with each other to give the adduct.

As used herein, the term "aromatization", "aromatizing", or "aromatized" refers generally to a chemical reaction in which an aromatic system is formed. The term can also refer to the production of a new aromatic moiety in a molecule which is already aromatic.

It is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by prior disclosure. Further, the dates of publication provided could be different from the actual publication dates that may need to be independently confirmed.

Unless otherwise indicated, the present disclosure is not limited to particular materials, reagents, reaction materials, manufacturing processes, or the like, as such can vary. It is also to be understood that the terminology used herein is for purposes of describing particular embodiments only and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Various embodiments relate to a polymer having, made of, or made from a plurality of monomers having the structure:

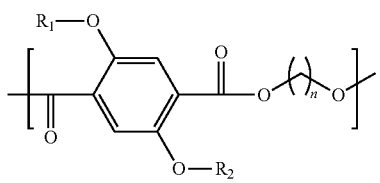

wherein n may be from 1 to 20, and wherein $R_1$ and $R_2$ may be independently selected from hydrogen or a $C_1$-$C_6$ hydrocarbon substituent.

According to various embodiments, the polymer may be a copolymer, possessing additional repeat units. According to various embodiments, the polymer may be a polyalkylene dihydroxyterephthalate, having the structure:

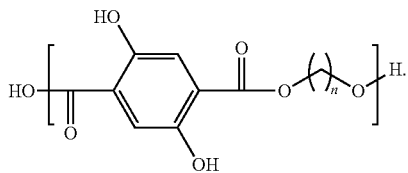

According to various embodiments, the polymer may be a polyalkylene dimethoxyterephthalate, having the structure:

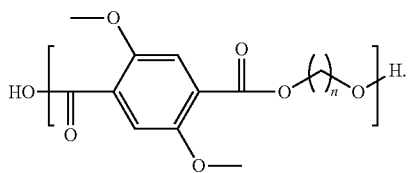

According to various embodiments, the polymer may have a number average molecular weight within a range having a lower limit and/or an upper limit. The range may include or exclude the lower limit and/or the upper limit. The lower limit and/or upper limit may be selected from about 1,000, 5,000, 10,000, 50,000, 100,000, 150,000, 200,000, 250,000, 300,000, 350,000, 400,000, 450,000, 500,000, 550,000, 600,000, 650,000, 700,000, and 750,000 Daltons. For example, according to certain embodiments, according to various embodiments, the polymer may have a number average molecular weight in a range of from about 5,000 to about 500,000, or any combination of lower limits and upper limits described.

According to various embodiments, the polymer may have a weight average molecular weight within a range having a lower limit and/or an upper limit. The range may include or exclude the lower limit and/or the upper limit. The lower limit and/or upper limit may be selected from about 5000, 10000, 50000, 100000, 150000, 200000, 250000, 300000, 350000, 400000, 450000, 500000, 550000, 600000, 650000, 700000, 750000, 800000, 850000, 900000, 950000, 1000000, 1050000, 1100000, 1150000, 1200000, 1250000, 1300000, 1350000, 1400000, 1450000, and 1500000 Daltons. For example, according to certain embodiments, according to various embodiments, the polymer may have a weight average molecular weight in a range of from about 5,000 to about 500,000, or any combination of lower limits and upper limits described.

According to various embodiments, the polymer may have a dispersity within a range having a lower limit and/or an upper limit. The range may include or exclude the lower limit and/or the upper limit. The lower limit and/or upper limit may be selected from about 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, 9, 9.1, 9.2, 9.3, 9.4, 9.5, 9.6, 9.7, 9.8, 9.9, and 10. For example, according to certain embodiments, according to various embodiments, the polymer may have a dispersity in a range of from about 1.1 to about 10, or any combination of lower limits and upper limits described.

According to various embodiments, the polymer may have a glass transition temperature within a range having a lower limit and/or an upper limit. The range may include or exclude the lower limit and/or the upper limit. The lower limit and/or upper limit may be selected from about 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, and 200 degrees Celsius. For example, according to certain embodiments, according to various embodiments, the polymer may have a glass transition temperature in a range of from about 5 to about 180° C., or any combination of lower limits and upper limits described.

Various embodiments relate to a method for producing a polymer, including a polymer according to other embodiments described herein. The method including esterifying succinic acid to form dimethyl succinate; dimerizing the dimethyl succinate to obtain dimethyl succinyl succinate; aromatizing the dimethyl succinyl succinate via at least one selected from N-chlorosuccinimide oxidation, sulfuric acid oxidation, dimethylsulfoxide oxidation, hydrogen peroxide oxidation, and transfer dehydrogenation to produce dimethyl 2,5-dihydroxyterephthalate; hydrolysing and optionally methylating the dimethyl 2,5-dihydroxyterephthalate to produce a monomer; and polymerizing the monomer with a comonomer comprising at least 2 hydroxyl groups to produce the polymer. According to various embodiments, the comonomer may be a linear diol having the structure:

in which n is from 1 to 20.

According to various embodiments, biosuccinic acid, which is one of the most promising biobased platform chemicals thanks to its low cost and chemical versatility, may be used as a precursor to synthesize two series of novel, biorenewable thermoplastics with tunable glass transition temperatures: polyalkylene dihydroxyterephthalates and polyalkylene dimethoxyterephthalates. For example, polyethylene dihydroxyterephthalate (PEDHT) exhibits a $T_g$ of 168° C. and polyethylene dimethoxyterephthalate (PEDMT) exhibits a $T_g$ of 74° C.; the other polymers in the series cover a wide range of glass transition temperatures from 6 to 168° C. The 100% biorenewable PEDMT polyester exhibits a glass transition temperature ($T_g$ of 74° C.) that is an excellent match for that of commercial polyethylene terephthalate (PET, $T_g$ of 72° C.)

The polymers and copolymers according to various embodiments may serve as replacements for polyethylene terephthalate (PET), which is made from fossil fuels. With tunable glass transition temperatures ($T_g$), these polymers could also replace polymers with higher $T_g$ values, such as polystyrene or polycarbonate.

The targeted bioaromatic monomers used according to various embodiments are not naturally-occurring, but can be synthesized readily from non-aromatic, biobased succinic acid (SA). This diacid sugar fermentation product is one of the ten most promising biobased platform chemicals because of its low cost and chemical versatility.[42] The current uses of SA include: surfactants, additives, a precursor to various industrial chemicals (such as butanediol), and as a monomer for polyester and polyamide production.[43] The petrochemical production of this four-carbon diacid (butane to maleic anhydride) has continually yielded to sustainable glucose fermentation strategies.[44] The annual production of biosuccinic acid (bio-SA) was around 38,000 metric tons in 2013-2014 and is expected to reach 600,000 metric tons by 2020, mostly supplanting the petro-SA market.[45,46,47] The cost of bio-SA is estimated to be $0.55-1.10 per kg.[44]

The low-cost and bioavailability of bio-SA are features that render it attractive for high-volume polymer production.[48] However, its various polyesters generally have low glass transition temperatures, owing largely to conformational flexibility. For example, the $T_g$ of polyethylene succinate is −11° C.[49] According to various embodiments, the cyclization chemistry of SA may afford rigid ring monomers, structurally related to terephthalic acid.

Aromatization conditions applied to dimethyl succinyl succinate (DSS) can yield several products, including dimethyl terephthalate,[50] 2,5-diaminoterephthalic esters,[51,52,53] and dimethyl 2,5-dichloro-3,6-dihydroxyterephthalate.[54] Various embodiments focus on the simple aromatization conditions offered by N-chlorosuccinimide, which only serves to remove $H_2$ from DSS, thereby yielding dimethyl 2,5-dihydroxyterephthalate (DDHT).[55,56] This is a convenient precursor to terephthalic acid derivatives 2,5-dihydroxyterephthalic acid (DHTA) and 2,5-dimethoxyterephthalic acid (DMTA).[57,58,59] Because N-chlorosuccinimide is not an ideal oxidant for this aromatization, other environmentally friendly strategies may be used for this reaction, including sulfuric acid oxidation,[60] dimethylsulfoxide oxidation,[61] hydrogen peroxide oxidation,[62] and transfer dehydrogenation.[63]

According to various embodiments, a four-step syntheses of DHTA and DMTA may be employed:
1) esterification of succinic acid (SA) to form dimethyl succinate;[64]
2) dimerization of dimethyl succinate to obtain dimethyl succinyl succinate (DSS);[31,57]
3) aromatization with N-chlorosuccinimide to produce dimethyl 2,5-dihydroxyterephthalate;[55,65] and
4) hydrolysis to produce DHTA[66] or one-pot methylation/hydrolysis to produce DMTA.[67]

DHTA and DMTA were obtained from succinic acid in good overall yields of 49.4% and 50.3%, respectively.

FIG. 1 is an example according to various embodiments illustrating the synthesis of aromatic 2,5-dihydroxyterephthalic acid (DHTA) and 2,5-dimethoxyterephthalic acid (DMTA) in four steps from succinic acid, which can be obtained from sugar.

Figure 2:
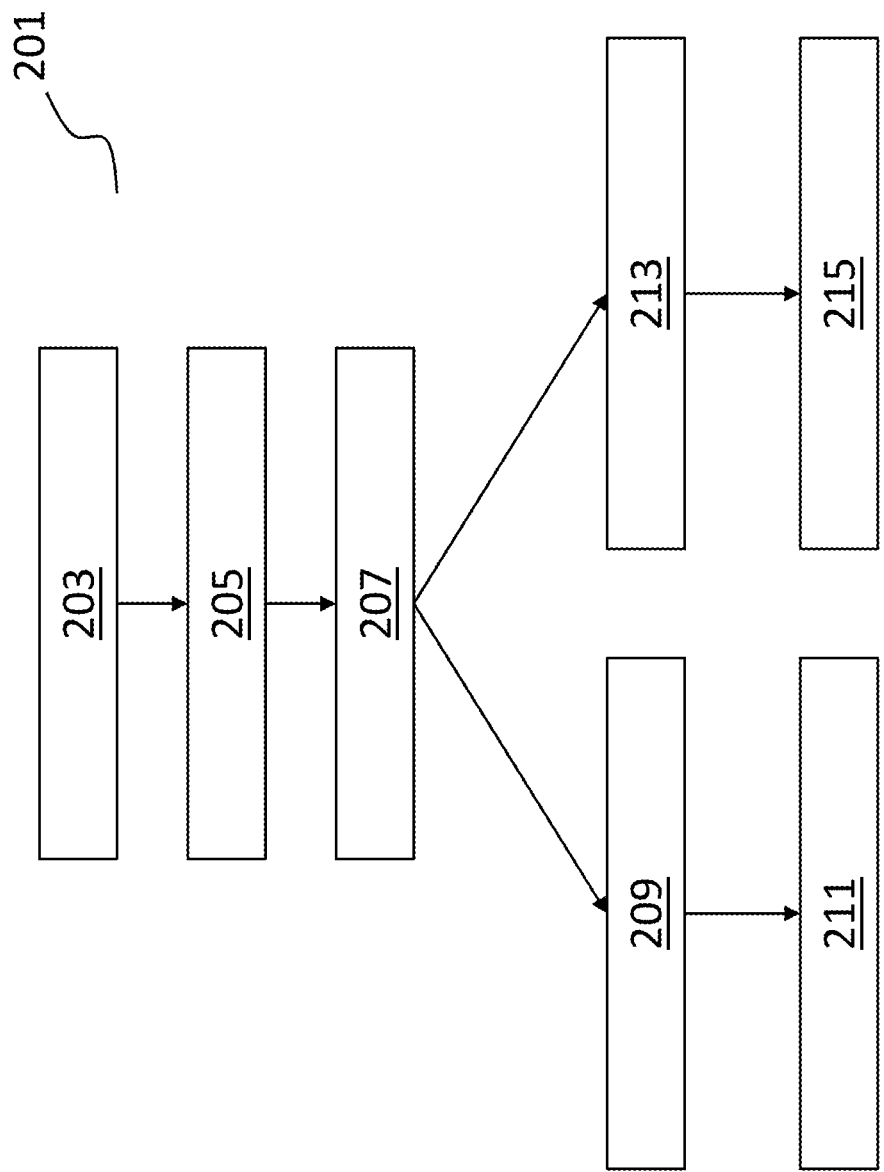
FIG. 2: is an example according to various embodiments, illustrating the synthesis processes of FIG. 1 in the form of a schematic block diagram.
Figure 3:
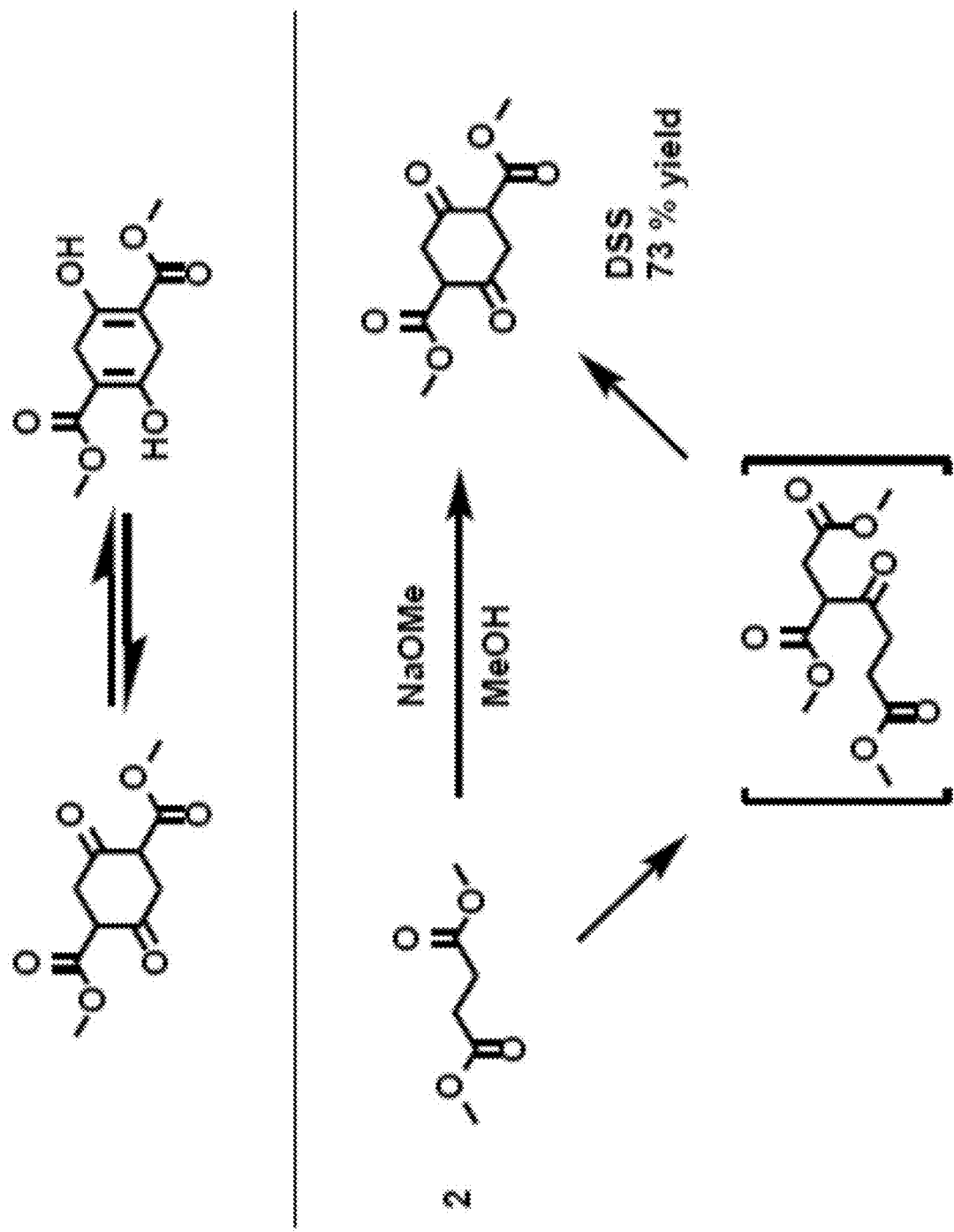
FIG. 3: is an example according to various embodiments illustrating the dimerization of dimethyl succinate to obtain dimethyl succinyl succinate.

FIG. 2 is an example according to various embodiments, illustrating the synthesis processes of FIG. 1 in the form of a schematic block diagram. Referring to FIG. 2, at box 203, succinic acid may be esterified to form dimethyl succinate. At box 205, the dimethyl succinate may be dimerized to obtain dimethyl succinyl succinate. FIG. 3 is an example according to various embodiments illustrating the dimerization of dimethyl succinate to obtain dimethyl succinyl succinate.

Figure 4:
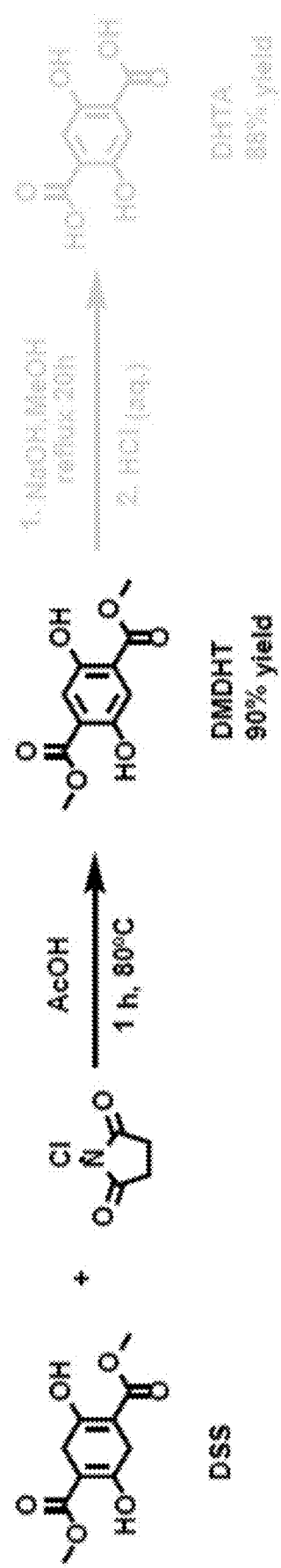
FIG. 4: is an example according to various embodiments illustrating the aromatization of dimethyl succinyl succinate with N-chlorosuccinimide and the subsequent hydrolysis of dimethyl 2,5-dihydroxyterephthalate to produce dihydroxyterephthalic acid.

Referring again to FIG. 2, at box 207, the dimethyl succinyl succinate may be aromatized via at least one selected from N-chlorosuccinimide oxidation, sulfuric acid oxidation, dimethylsulfoxide oxidation, hydrogen peroxide oxidation, and transfer dehydrogenation to produce dimethyl 2,5-dihydroxyterephthalate. At box 209, the dimethyl 2,5-dihydroxyterephthalate may be hydrolyzed to produce dihydroxyterephthalic acid. FIG. 4 is an example according to various embodiments illustrating the aromatization of dimethyl succinyl succinate with N-chlorosuccinimide N-chlorosuccinimide and the subsequent hydrolysis of dimethyl 2,5-dihydroxyterephthalate to produce dihydroxyterephthalic acid.

Referring again to FIG. 2, at box 213, the dihydroxyterephthalic acid may be reacted with a diol to produce a polymer. At box 213, the dimethyl 2,5-dihydroxyterephthalate may be methylated and hydrolyzed via any suitable method, for example a one-pot methylation/hydrolysis, to produce 2,5-dimethoxyterephthalic acid. At box 215, the 2,5-dimethoxyterephthalic acid may be reacted with a diol to produce a polymer.

Various embodiments relate to polyalkylene dihydroxyterephthalates, which may be illustrated by Structure A, wherein n may be from 1 to 20.

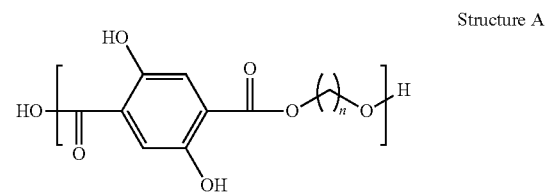

Structure A

Various embodiments relate to polyalkylene dimethoxyterephthalates, which may be illustrated by Structure B, wherein n may be from 1 to 20.

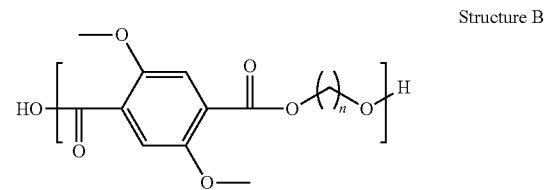

Structure B

More generally, various embodiments relate to polyalkylene terephthalates according to Structure C, wherein n may be from 1 to 20, and wherein $R_1$ and $R_2$ may be independently selected from hydrogen or a $C_1$-$C_6$ hydrocarbon substituent.

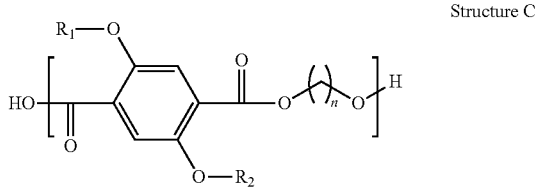

Structure C

For polyalkylene dihydroxyterephthalates, the glass transition temperature ($T_g$) ranged from 36 to 168° C. For polyalkylene dimethoxyterephthalates, the $T_g$ ranged from 6 to 74° C.

Figure 5:
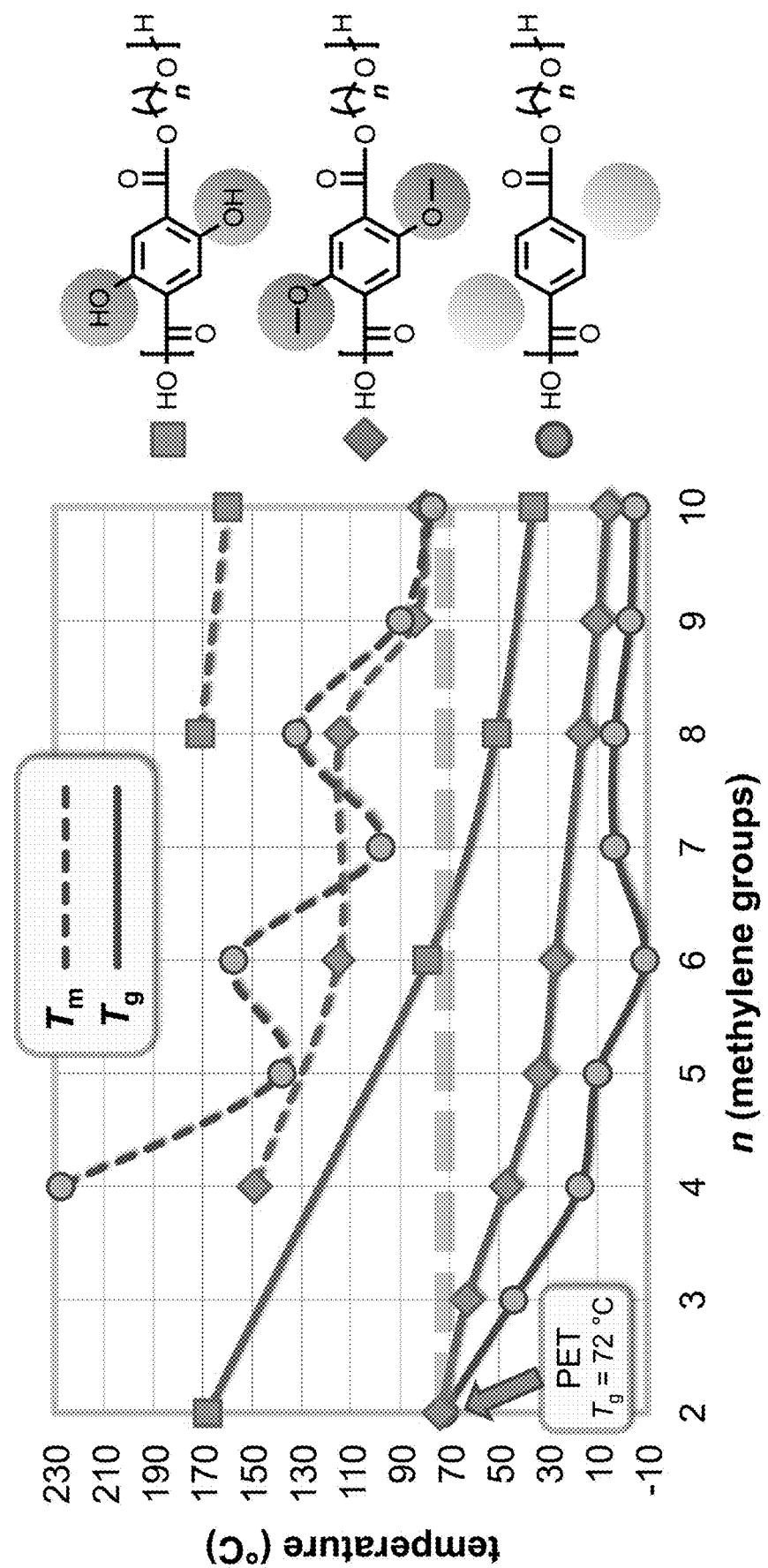
FIG. 5: is an example according to various embodiments illustrating polymer melting temperature ($T_m$, dashed lines) and glass transition temperature ($T_g$, solid lines) for polyalkylene dihydroxyterephthalates (orange squares), polyalkylene dimethoxyterephthalates (blue diamonds), and polyalkylene terephthalates (gray circles)[9] as a function of methylene spacers (n) present in the constituent diol employed for synthesis.

FIG. 5 is an example according to various embodiments illustrating polymer melting temperature ($T_m$, dashed lines) and glass transition temperature ($T_g$, solid lines) for polyalkylene dihydroxyterephthalates (orange squares), polyalkylene dimethoxyterephthalates (blue diamonds), and polyalkylene terephthalates (gray circles)[9] as a function of methylene spacers (n) present in the constituent diol employed for synthesis.

FIG. 5 shows the glass transition temperature (solid lines) graphed as a function of the number of methylene spacers present in the diols (n) of the two novel polymer series from Table 2 (diol+DHTA) and Table 5 (diol+DMTA). For comparison, literature data is also plotted for polyalkylene terephthalates.[9] Clearly, the polyalkylene dihydroxyterephthalates (FIG. 1, orange squares) display significantly higher $T_g$ values than the polyalkylene dimethoxyterephthalates (FIG. 1, blue diamonds), for a given value of n. For example, polyethylene dihydroxyterephthalate (PEDHT, $T_g$=168° C.) has a $T_g$ value that is 94° C. higher than that of polyethylene dimethoxyterephthalate (PEDMT, $T_g$=74° C.). The corresponding difference for the polydecylene (n=10) polyesters is lower at 30° C. (=36° C.-6° C.). The origin of this difference is likely the hydrogen bonding (intra- and intermolecular) present in the former, but absent in the latter. These interactions require greater thermal energy to be broken so that long-range segmental motion of polymers can occur and afford a rubbery state. Although we have not specifically detected branching/crosslinking via the aromatic hydroxy group, this is certainly possible and would also increase the $T_g$ value. Typically, such aromatic esters are much less stable than aliphatic esters; but they could form under the forcing polymerization conditions employed.

Moreover, the polyalkylene dimethoxyterephthalates excelled the known polyalkylene terephthalates regarding measured $T_g$ values.[9,68,69] Although polarity arguments likely pertain, an additional rationale is the larger conformational barriers imparted by the methoxy groups compared to hydrogen substituents. The differences are not large, but consistently favor the more substituted polymer. For example, polypentylene dimethoxyterephthalate ($T_g$=33° C.) shows a $T_g$ value 23° C. above that of polypentylene terephthalate ($T_g$=10° C.), while polyethylene dimethoxyterephthalate (PEDMT) shows a $T_g$ value just 2° C. above that of polyethylene terephthalate (PET). In fact, PEDMT, with its $T_g$ of 74° C., is the best overall match among these novel polyesters to the fossil-fuel archetype PET, with its $T_g$ of 72° C.[9]

Polyalkylene terephthalates and other polymers with alkylene segments invariably exhibit lower $T_g$ values as the alkylene segment length increases. The summary explanation for this is that such polymers possess a greater fraction of "flexible bonds,"[9] which can be interpreted as lower average conformational barriers and more facile segmental motion. The two novel polymer series reported herein are no exception. For polyalkylene dihydroxyterephthalates (Table 1), the addition of eight methylene groups to the repeat unit decreases the $T_g$ by 132° C. (=168° C.-36° C.) for an average effect of 16.5° C. per methylene. For polyalkylene dimethoxyterephthalates (Table 3), the addition of eight methylene groups to the repeat unit decreases the $T_g$ by 68° C. (=74° C.-6° C.) for an average effect of 8.5° C. per methylene.

A similar effect is observed for the polymer melting temperatures ($T_m$), as illustrated by the dashed lines in FIG. 5. In this case, the strong polar interactions of the aromatic units are diluted by an increasing fraction of non-polar methylene groups, and a drop in $T_m$ is observed.[9] For polyalkylene terephthalates, this trend is superimposed on an odd methylene/even methylene dependence, which directly impacts crystal lattice packing.[70] Those polymers with an even number of methylene groups pack better and display higher melting temperatures.

For the twelve novel polyesters reported in Table 2 and Table 5, melting temperatures were observed (by DSC) for only seven; five of these did not display a melting endotherm under the conditions employed. Still the aforementioned trend seems applicable, according to the dashed orange and dashed blue lines of FIG. 2. For both series, the $T_m$ decreases with increasing alkylene spacer length, albeit there are limited data points to unequivocally defend this trend. And, the odd/even dependence cannot be established since only one polymer with an odd number of methylenes exhibited a melting temperature (n=9; Table 3, Entry 7).

Note also that the hydroxy-substituted polymers melt higher than the corresponding methoxy-substituted polymers. For example, polyoctylene dihydroxyterephthalate has a $T_m$ of 171° C., while polyoctylene dimethoxyterephthalate has a $T_m$ of only 114° C. Most likely, the hydrogen bonding present in the former translates to better polymer packing and a greater lattice energy. Interestingly, the less polar polyalkylene terephthalates generally melt higher than the more polar polyalkylene dimethoxyterephthalates (except for n=10). This could be attributed to simple space-packing effects, with two methoxy groups not fitting efficiently into the crystal lattice.

EXAMPLES

The following examples are put forth to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. The purpose of the following examples is not to limit the scope of the various embodiments, but merely to provide examples illustrating specific embodiments.

Generally, according to the examples, succinic acid, a biobased platform chemical, was used as a precursor to synthesize the aromatic monomers, 2,5-dihydroxyterephthalic acid and 2,5-dimethoxyterephthalic acid. Two copolymer series were generated with linear diol comonomers, $HO(CH_2)_nOH$, of varying length with n=2 to 10. For polyalkylene dihydroxyterephthalates, the glass transition temperature ($T_g$) ranged from 36 to 168° C. For polyalkylene dimethoxyterephthalates, the $T_g$ ranged from 6 to 74° C.

More specifically, according to the examples, biobased succinic acid was converted into the terephthalic acid analogues 2,5-dihydroxyterephthalic acid (DHTA) and 2,5- dimethoxyterephthalic acid (DMTA), as illustrated in FIG. 1. These were polymerized with linear diols of varying length to afford two polymer series: polyalkylene dihydroxyterephthalates and polyalkylene dimethoxyterephthalates. Both polymer series exhibited a logical relationship between structure and thermal properties. Specifically, the $T_g$ value decreased with an increasing number of methylene groups (n=2-10) in the polymer repeat unit. Hydroxy side groups conferred higher $T_g$ values (168 to 36° C.); methoxy side groups conferred lower $T_g$ values (74 to 6° C.). The known polyalkylene terephthalates exhibit still lower $T_g$ values (72 to −9° C.).[9] The presumed participation of the pendant hydroxy groups in hydrogen bonding explains the high $T_g$ values for that polymer series. Polymer melting temperatures followed a similar dependence on methylene spacer length. As the aromatic component was diluted with additional, non-polar methylenes, $T_m$ diminished. Based on the polymeric properties, 2,5-dimethoxyterephthalic acid is an apt, biobased surrogate for terephthalic acid. With its $T_g$ of 74° C., polyethylene dimethoxyterephthalate (PEDMT) is a structural and functional analogue of polyethylene terephthalate (PET), which has a $T_g$ of 72° C.

Example 1

Polyalkylene dihydroxyterephthalates were synthesized from DHTA and four different α,ω-alkanediols (ethylene glycol, 1,6-hexanediol, 1,8-octanediol, and 1,10-decanediol) under argon during a 14-hour temperature ramp from 190 to 260° C. using 1 mol % of $Sb_2O_3$ catalyst, followed by high dynamic vacuum to eliminate the water by-product for an additional 4 hours (Scheme 6). All four polymers were obtained in high yields (above 80%) and showed good thermal stability with a 5% mass loss ($T_{95\%}$) under nitrogen at temperatures from 211 to 334° C.

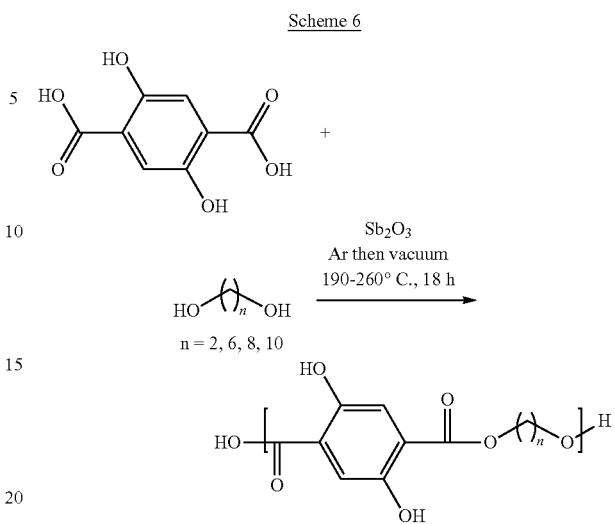

Scheme 6

The poor solubility of three of these polymers in the gel permeation chromatography (GPC) solvent hexafluoroisopropanol (HFIP) precluded reliable molecular weight determinations. This poor solubility may be attributable to cross-linking via the aromatic hydroxy groups, or to persistent hydrogen bonding of the same groups. Only polydecylene dihydroxyterephthalate was suitably soluble in HFIP and thus, its number average molecular weight ($M_n$) and dispersity index (Đ) were determined as $M_n$=13,000 Da and Đ=1.7 (Entry 2-4).

Table 1 illustrates compounds according to Structure A having various carbon chain lengths (n), that were produced as described above, according to Scheme 6.

TABLE 1

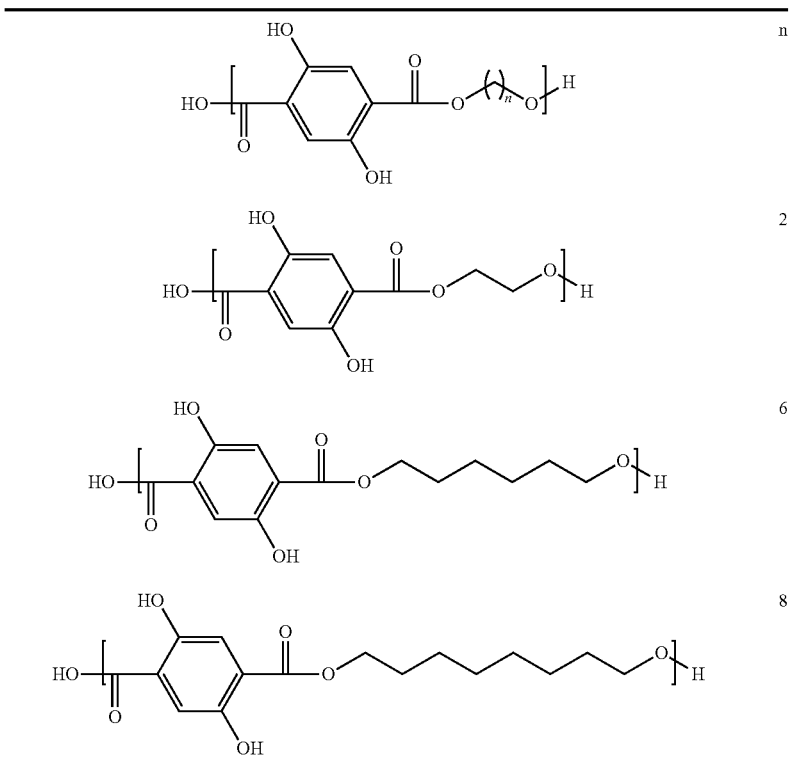

TABLE 1-continued

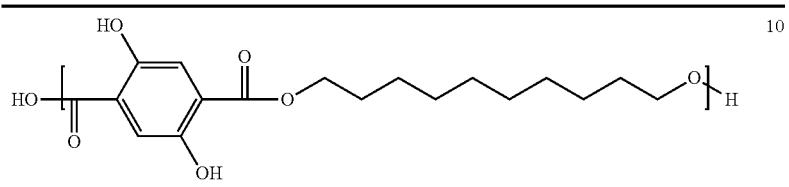

Table 2 shows data related to the synthesis and characterization of polyalkylene dihydroxyterephthalates of Structure A with various chain lengths (n) that were produced as described above, according to Scheme 6. The synthesis of polyalkylene dihydroxyterephthalates was carried out with 1 mol % $Sb_2O_3$. The synthesis was a melt polymerization under argon for 14 hours with a temperature ramp from 190 to 260° C., followed by 4 hours of dynamic vacuum. The number average molecular weight ($M_n$) and the weight average molecular weight ($M_w$) reported in Table 2 were obtained by gas permeation chromatography (GPC) in hexafluoroisopropanol (HFIP) at 40° C. versus polymethyl methacrylate (PMMA) standards. The dispersity index, or formerly polydispersity index (PDI), or heterogeneity index, or simply dispersity (Đ), as reported in Table 2, is a measure of the distribution of molecular mass in a given polymer sample. Đ (PDI) of a polymer was calculated: $Đ=M_w/M_n$. The glass transition temperature ($T_g$) and the melting temperature ($T_m$) reported in Table 2 were determined by Differential Scanning calorimetry (DSC). In Table 2 "n.o." stands for not observed. In Table 2, $T_{95\%}$ indicates the temperature at which a 5% mass loss is observed under nitrogen. In Table 2, "e" indicates that the insolubility of the polymer in HFIP prevented GPC analysis.

TABLE 2

| Entry | Structure A with n of | Yield (%) | $M_n$ (Da) | $M_w$ (Da) | Đ | $T_g$ (° C.) | $T_m$ (° C.) | $T_{95\%}$ (° C.) |
|---|---|---|---|---|---|---|---|---|
| 2-1 | 2 | 80.0 | e | e | e | 168 | n.o. | 211 |
| 2-2 | 6 | 84.9 | e | e | e | 79 | n.o. | 334 |
| 2-3 | 8 | 89.5 | e | e | e | 51 | 171 | 331 |
| 2-4 | 10 | 81.4 | 13,000 | 22,100 | 1.7 | 36 | 160 | 327 |

Example 2

For diacid/diol polycondensation at high temperatures, the loss of volatile diols would prevent the optimal 1:1 stoichiometric ratio necessary for ideal AA/BB copolymerization. Thus, a study was conducted with varying amounts of excess diol for the polymerization of DMTA and ethylene glycol. Table 3 summarizes data obtained while optimizing polymerization conditions for polymers prepared from the reaction of DMTA and ethylene glycol (n=2) or DMTA and 1,3-propanediol (n=3). The melt polymerization was conducted with 1 mol % $Sb_2O_3$ under argon for 22 hours with a temperature ramp from 190 to 240° C., followed by 8 hours of dynamic vacuum. The number average molecular weight ($M_n$) and the weight average molecular weight ($M_w$) were obtained by Gas Permeation Chromatography (GPC) in hexafluoroisopropanol (HFIP) at 40° C. versus polymethyl methacrylate (PMMA) standards. The glass transition temperature ($T_g$) was determined by Differential Scanning calorimetry (DSC). As discussed with respect to Example 1, the dispersity, $Đ=M_w/M_n$.

As shown in Table 3, lowering the ethylene glycol equivalents from 6.0 to 3.0 to 2.0 to 1.2 (Entry 3-1, 3-2, 3-3, and 3-4) revealed the following trends: a decrease of $M_n$ from 10,200 to 5,900 Da; a narrowing of Đ from 7.8 to 3.3; an increase in $T_g$ from 59 to 74° C.; and a decrease in polymer solubility. Although 1.2 equivalents did not afford the highest measured molecular weight, the 1.0:1.2 ratio was selected for further DMTA/ethylene glycol polymerizations because of optimal polymerization control (low Đ) and a high $T_g$ value.

TABLE 3

| Entry | n | Diacid:Diol | Yield (%) | $M_n$ (Da) | $M_w$ (Da) | Đ [b] | $T_g$ (° C.) |
|---|---|---|---|---|---|---|---|
| 3-1 | 2 | 1.0:6.0 | 79.4 | 10,200 | 79,600 | 7.8 | 59 |
| 3-2 |   | 1.0:3.0 | 61.4 | 11,500 | 74,800 | 6.5 | 72 |
| 3-3 |   | 1.0:2.0 | 70.1 | 4,000 | 16,000 | 4.0 | 75 |
| 3-4 |   | 1.0:1.2 | 66.1 | 5,900 | 19,500 | 3.3 | 74 |
| 3-5 | 3 | 1.0:1.0 | 73.2 | 6,800 | 37,400 | 5.5 | 57 |
| 3-6 |   | 1.0:1.03 | 87.5 | 21,900 | 81,000 | 3.7 | 63 |

For the polymerization of DMTA and 1,3-propandiol, there is a drastic difference between 1.0 and 1.03 equivalents of the diol. For the stoichiometric case (Entry 3-5), $M_n$ values are about one-third those obtained with a slight excess (Entry 3-6). Moreover, 1.03 equivalents yields better polymerization control (lower Đ) and a higher $T_g$ value. Based on this, further DMTA/diol polymerizations with 1,3-propanediol, 1,4-butanediol, and 1,5-pentanediol (all liquids at room temperature) employed the 1.0:1.03 ratio. DMTA/diol polymerizations with larger diols (1,6-hexanediol, 1,8-octanediol, 1,9-nonanediol, and 1,10-decanediol) employed the 1.0:1.0 ratio as diol volatility is expected to be acceptably low (all solids at room temperature).

Example 3

A synthesis and characterization of polyalkylene dimethoxyterephthalates was carried out as a melt polymerization with 1 mol % $Sb_2O_3$ under argon for 22 hours with temperature ramp from 190 to 240° C., followed by 8 hours of dynamic vacuum. As shown in Scheme 7.

Scheme 7
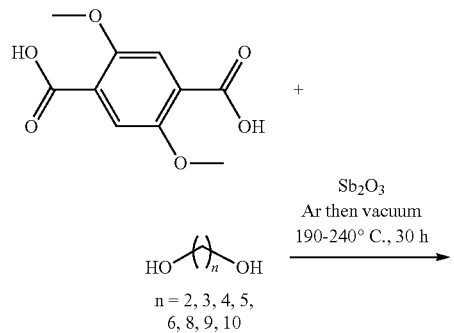
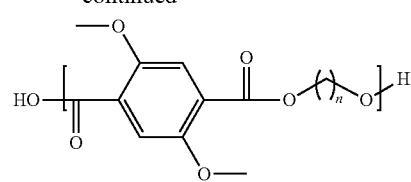
Table 4 illustrates compounds according to Structure B having various carbon chain lengths (n) that were prepared according to Scheme 7.
TABLE 4
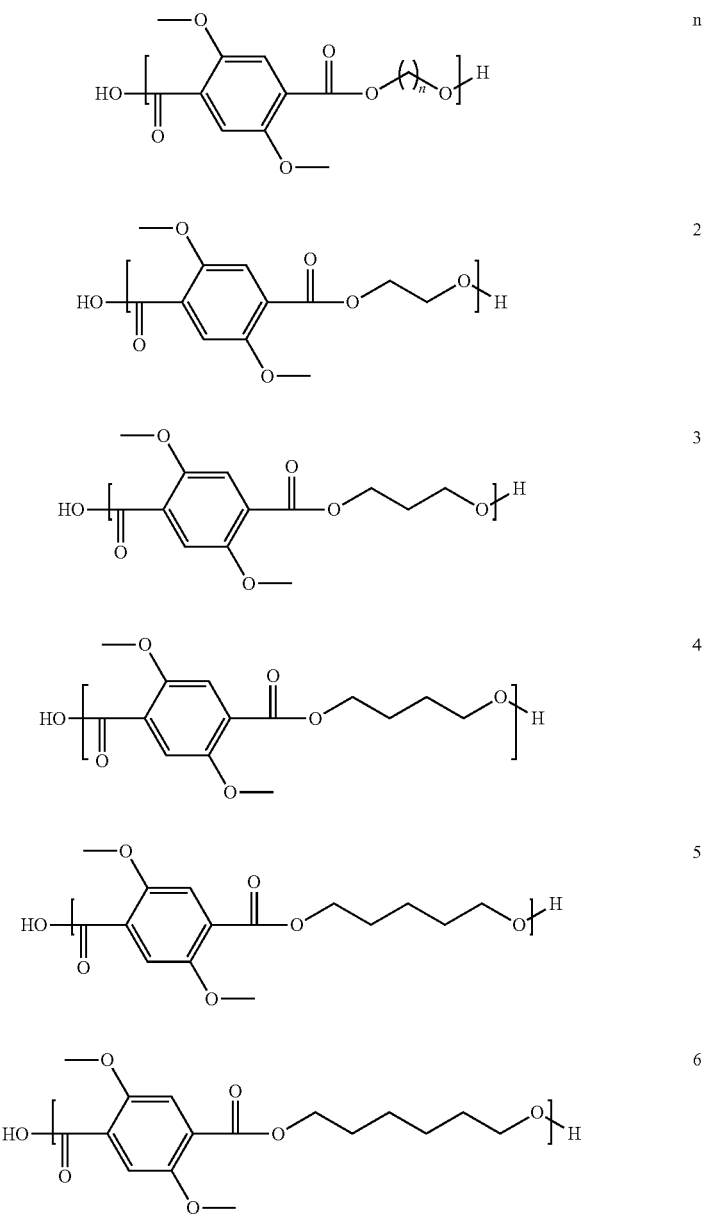

TABLE 4-continued

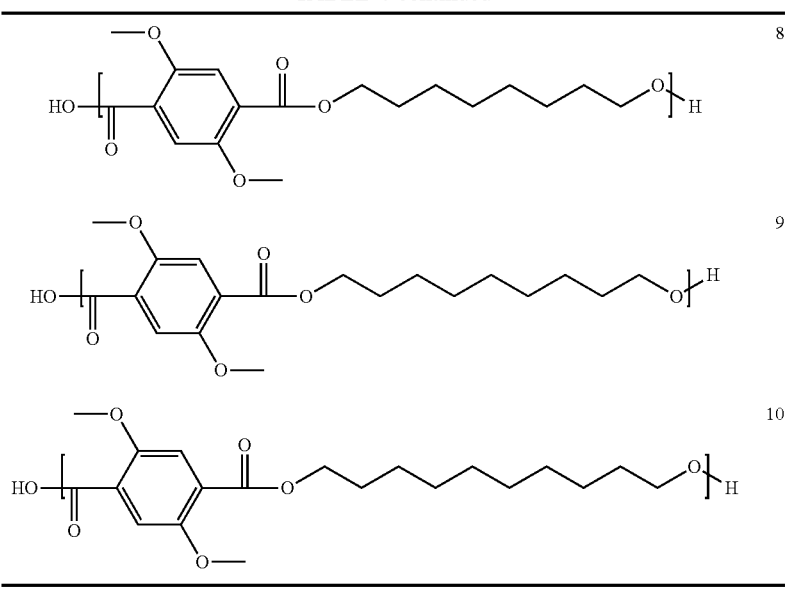

Table 5 provides data related to the synthesis and characterization of polyalkylene dimethoxyterephthalates. The number average molecular weight ($M_n$) and the weight average molecular weight ($M_w$) were obtained by gas permeation chromatography (GPC) in hexafluoroisopropanol (HFIP) at 40° C. versus polymethyl methacrylate (PMMA) standards. As discussed with respect to Example 1, the dispersity, $Đ=M_w/M_n$. The glass transition temperature ($T_g$) was determined by differential scanning calorimetry (DSC). In general, the melting temperature ($T_m$) values were measured during the first thermal cycle, but $T_m$ values annotated with "d" were measured during the second thermal cycle. In Table 5, the abbreviation "n.o." means not observed. $T_{95\%}$ refers to the temperature at which 5% mass loss is observed under nitrogen.

As shown in Table 5, polyalkylene dimethoxyterephthalates were obtained in good to high yields (66 to 88%). $M_n$ values were high and ranged from 19,500 to 36,200 Da, except for the polymerization with ethylene glycol, described above. Polymers made from the longer diols (n≥5) displayed typical Đ values for step-growth polymerizations, ranging from 2.2 to 2.7 (Entries 5-4, 5-5, 5-6, 5-7, and 5-8). Higher Đ values (3.3-4.6) were measured for polymers when shorter diols (n≤4) were employed. We attribute this to the common deviation from ideal step-growth behavior associated with high polymerization viscosity.

TABLE 5

| Entry | Structure B with n of | Yield (%) | $M_n$ (Da) | $M_w$ (Da) | Đ | $T_g$ (° C.) | $T_m$ (° C.) | $T_{95\%}$ (° C.) |
|---|---|---|---|---|---|---|---|---|
| 5-1 | 2 | 66.1 | 5,900 | 19,500 | 3.3 | 74 | n.o. | 325 |
| 5-2 | 3 | 87.5 | 21,900 | 81,000 | 3.7 | 63 | n.o. | 338 |
| 5-3 | 4 | 84.9 | 19,500 | 89,700 | 4.6 | 47 | 149 $^d$ | 328 |
| 5-4 | 5 | 66.0 | 31,700 | 76,100 | 2.4 | 33 | n.o. | 337 |
| 5-5 | 6 | 74.3 | 21,000 | 56,700 | 2.7 | 27 | 115 | 341 |
| 5-6 | 8 | 70.4 | 23,000 | 57,500 | 2.5 | 16 | 114 $^d$ | 340 |
| 5-7 | 9 | 76.2 | 29,000 | 63,800 | 2.2 | 10 | 84 | 350 |
| 5-8 | 10 | 78.2 | 36,200 | 90,500 | 2.5 | 6 | 80 | 348 |

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C § 112, sixth paragraph. In particular, the use of "step of" in the claims herein is not intended to invoke the provisions of 35 U.S.C § 112, sixth paragraph.

All patents, patent applications, provisional applications, and publications referred to or cited herein, supra or infra, are incorporated by reference in their entirety, including all figures and tables, to the extent they are not inconsistent with the explicit teachings of this specification.

It should be emphasized that the above-described embodiments of the present disclosure are merely possible examples of implementations and are merely set forth for a clear understanding of the principles of this disclosure. It should be understood that the examples and embodiments described herein are for illustrative purposes only and that various modifications or changes in light thereof will be suggested to persons skilled in the art and are to be included within the spirit and purview of this application. Many variations and modifications may be made to the above-described embodiment(s) of the disclosure without departing substantially from the spirit and principles of the disclosure. All such modifications and variations are intended to be included herein within the scope of this disclosure and protected by the following claims.

REFERENCES

[1] Based on 41.56 million metric tons (MMT) PET and a total of 311 MMT plastics produced in 2014. Statista, *Polyethylene terephthalate (PET) production worldwide in 2014 and 2020*, accessed March 2018. https://www.statista.com/statistics/650191qalobal-polyethylene-terephthalate-production-outlook/. Statista, *Production of plastics worldwide from 1950 to 2016*, accessed March 2018.

https://www.statista.com/statistics/282732/global-production-of-plastics-since-1950/
2. A. J. East, "Polyesters, Thermoplastics" in *Kirk-Othmer Encyclopedia of Chemical Technology*, John Wiley & Sons, New York, 2006, 20, 31-95.
3. S. Munoz-Guerra, C. Lavilla, C. Japu and A. Martinez de Ilarduya, *Green Chemistry*, 2014, 16, 1716-1739.
4. Smithers Pira, *Demand for PET Packaging Material to reach $60 billion by 2019*, accessed March 2018. http://www.smitherspira.com/news/2014/april/demand-for-pet-packaging-material-in-2019
5. Smithers Pira, *The Future of PET Packaging to 2021*, accessed March 2018. https://www.smitherspira.com/industry-market-reports/packaging!pet-packaging-to-2021
6. Rule, M. in Polymer Handbook, ed. J. Brandrup, E. H. Immergut, E. A. Grulke, A. Abe and D. R. Abe, John Wiley & Sons, New York, 4th ed, 2005, pp. V/113-V/118.
7. H. A. Schneider, *J. Appl. Polym. Sci.*, 2003, 88, 1590-1599.
8. Rule, M. in Polymer Handbook, ed. J. Brandrup, E. H. Immergut, E. A. Grulke, A. Abe and D. R. Abe, John Wiley & Sons, New York, 4th ed, 2005, pp. V/113-V/118.
9. H. A. Schneider, *J. Appl. Polym. Sci.*, 2003, 88, 1590-1599.
10. United States Government Accountability Office "*Crude Oil: Uncertainty about Future Oil Supply Makes It Important to Develop a Strategy for Addressing a Peak and Decline in Oil Production*" GAO-07-283, February 2007, accessed March 2018. http://www.aao.aov/products/GAO-07-283
11. Ecotricity, *The End of Fossil Fuels*, accessed March 2018. https:/www.ecotricit.co.uk/our-green-energy/energy-independence/the-end-of-fossil-fuels
12. CSRWire, *The Coca-Cola Company Introduces Innovative Bottle Made From Renewable, Recyclable, Plant-Based Plastic*, May 14, 2009, accessed March 2018. http://www.csrwire.com/press_releases/22460-The-Coca-Cola-Company-Introduces-Innovative-Bottle-Made-From-Renewable-Recyclable-Plant-Based-Plastic
13. Coca-Cola. 3 *Lessons Coke Has Learned Since Launching PlantBottle Packaging*, Nov. 2, 2014, accessed March 2018. http://www.coca-colacompany.com/stories/3-lessons-coke-has-learned-since-launching-plantbottle
14. H. Ren, F. Qiao, Y. Shi, M. W. Knutzen, Z. Want, H. Du and H. Zhang, *J. Renew. Sustain. Energy*, 2015, 7, 041510.
15. M. Colonna, C. Berti, M. Fiorini, E. Binassi, M. Mazzacurati, M. Vannini and S. Karanam, *Green Chem.*, 2011, 13, 2543-2548.
16. M. B. Banella, C. Gioia, M. Vannini, M. Colonna, A. Celli and A. Gandini, *ChemSusChem*, 2016, 9, 942-945.
17. G. A. Kraus, S. Riley and T. Cordes, *Green Chem.*, 2011, 13, 2734-2736.
18. C. L. Williams, C.-C. Chang, P. Do, N. Nikbin, S. Caratzoulas, D. G. Vlachos, R. F. Lobo, W. Fan and P. J. Dauenhauer, *ACS Catal.*, 2012, 2, 935-939.
19. C. Vilela, A. F. Sousa, A. C. Fonseca, A. C. Serra, J. F. J. Coelho, C. S. R. Freire and A. J. D. Silvestre, *Polym. Chem.*, 2014, 5, 3119-3141.
20. F. Sousa, C. Vilela, A. C. Fonseca, M. Matos, C. S. R. Freire, G.-J. M. Gruter, J. F. J. Coelho and A. J. D. Silvestre, *Polym. Chem.*, 2015, 6, 5961-5989.
21. Avantium, YXY technology, accessed March 2018. https:/www.avantium.com/yxy/yxy-technology/
22. L. Mialon, A. G. Pemba and S. A. Miller, *Green Chem.*, 2010, 12, 1704-1706.
23. H. T. H. Nguyen, E. R. Suda, E. M. Bradic, J. A. Hvozdovich and S. A. Miller, "Polyesters from Bio-Aromatics" in *ACS Symposium Series Green Polymer Chemistry III: Biobased Materials and Biocatalysis*, ed. H. N. Cheng, R. A. Gross and P. B. Smith, 2015, Vol. 192, ch. 24, pp. 401-409.
24. L. Mialon, R. Vanderhenst, A. G. Pemba and S. A. Miller, *Macromol. Rapid Commun.*, 2011, 32, 1386-1392.
25. H. T. H. Nguyen, M. H. Reis, P. Qi and S. A. Miller, *Green Chem.*, 2015, 17, 4512-4517.
26. H. T. H. Nguyen, G. N. Short, P. Qi and S. A. Miller, *Green Chem.*, 2017, 19, 1877-1888.
27. F. Pion, P.-H. Ducrot and F. Allais, *Macromol. Chem. Phys.*, 2014, 215, 431-439.
28. Muncke, J. "PEF: New food contact polymer on the horizon" *Food Packaging Forum*, Nov. 19, 2013, accessed March 2018. http:/www.foodpackagingforum.org/News/PEF-New-food-contact-polymer-on-the-horizon
29. Bio-Based World News, *Avantium and Mitsui aim to deliver PEF bottles for 2020 Olympics*, Dec. 15, 2015, accessed March 2018. http:/www.biobasedworldnews.com/avantium-and-mitsui-aim-to-deliver-pef-bottles-for-2020-olympics
30. H. Ebert, *Justus Liebigs Annalen der Chemie*, 1885, 229, 45-88.
31. D. Seebach, T., Hoffmann, F. N. M. Kuhnle, J. N. Kinkel and M. Schulte, *Helv. Chim. Acta*, 1995, 78, 1525-1540.
32. C. Clerici, H. Van der Werff and D. Cordova, Flexible composite material and use hereof, process for making a flexible composite material, European Patent, 2,794,258 (A1), 2013.
33. D. J. Sikkema and V. L. Lishinsky, Rigid rod polymer based on pyridobisimidazole, U.S. Pat. No. 5,674,969, 1997.
34. X. Wang, V. Ho, R. A. Segalman and D. G. Cahill, *Macromolecules*, 2013, 46, 4937-4943.
35. T. D. Dang and J. D. Busbee, Composites comprising rigid-rod polymers and graphene nanoparticles and process for making the same, U.S. Patent Application, 2015218730 (A1), 2015.
36. H. H. Song, T. Cho, D. P. Heberer, T. D. Dang, F. E. Arnold and L. Tan, *J. Polym. Sci. Part B Polym. Phys.*, 2001, 39, 559-565.
37. T. Zhang, J. Jin, S. Yang, G. Li and J. Jiang, *Polym. Adv. Technol.*, 2011, 22, 743-747.
38. B. Imura, M. Shinoki, T. Matsumoto, E. Ichihashi and M. Hirose, Production of polyester, Japanese Patent, 60166320 (A), 1985.
39. H. Zorn, J. Hrach and W. Zeschmar, Copolyesters of 2,5-dihydroxyterephthalic acid, U.S. Pat. No. 3,477,989, 1969.
40. D. A. Gordon, Polyesters, U.S. Pat. No. 3,047,536, 1962.
41. K. Fukusaka, T. Suzuki and H. Kiuchi, Cellulose ester retardation film and polarizing plate using the same and liquid crystal display device, Japanese Patent, 2011128407 (A), 2011.
42. J. J. Bozell and G. R. Peterson, *Green Chem*, 2010, 12, 539-554.
43. *Top Value Added Chemicals from Biomass*, ed. T. Werby and G. Petersen, U.S. Department of Energy, 2004, accessed March 2018. https://www.nrel.gov/docs/fy04osti/35523.pdf
44. J. H. Ahn, Y.-S. Jang and S. Y. Lee, *Curr. Opin. Biotechnol.*, 2016, 42, 54-66.
45. J. M. Pianzo, M. E. Domine, V. Parvulescu and F. Petru, *Catal. Today*, 2015, 239, 17-24.
46. C. Pateraki, M. Patsalou, A. Vlysidis, N. Kopsahelis, C. Webb, A. A. Koutinas and M. Koutinas, *Biochem. Eng. J.*, 2016, 112, 285-303.

[47] R. Taylor, L. Nattrass, G. Alberts, P. Robson, C. Chudziak, A. Bauen, I. M. Libelli, G. Lotti, M. Prussi, R. Nistri, D. Chiaramonti, A. L. Contreras, H. Bos, G. Eggink, J. Springer, R. Bakker and R. van Ree, *From the Sugar Platform to biofuels and biochemical: Final report for the European Commission Directorate-General Energy*, 2015, accessed March 2018. https://ec.europa.eu/energy/sites/ener/files/documents/EC%20Sugar%20Platform%20final%20report.pdf

[48] Y. Zhu, C. Romain and C. K. Williams, *Nature*, 2016, 540, 354-362.

[49] A. Oishi, M. Zhang, K. Nakayama, T. Masuda and Y. Taguchi, *Polym. J.*, 2006, 38, 710-715.

[50] J. Kruper, C. L. Rand, D. C. Molzahn and B. Crawford, Process for producing terephthalic acid and terephthalic esters, U.S. Patent Application, WO2012125218 A1, 2012.

[51] H. Deter and V. Schmitt, *J. Phys. Org. Chem.*, 2006, 19, 603-607.

[52] M. Shimizu, Y. Asai, Y. Takeda, A. Yamatani and T. Hiyama, *Tetrahedron Lett.*, 2011, 52, 4084-4089.

[53] B. Tang, C. Want, Y. Want and H. Zhang, *Angew. Chem. Int. Ed.*, 2017, 56, 12543-12547.

[54] M. Strohmeier, A. M. Orendt, D. W. Alderman and D. M. Grand, *J. Am. Chem. Soc.* 2001, 123, 1713-1722.

[55] L. Steemers, M. J. Wanner, A. W. Ehlers, H. Heimstra and J. H. van Maarseveen, *Org. Lett.*, 2017, 19, 2342-2345.

[56] H. Liu and Q. Wang, *Asian J. Chem.* 2014, 26, 5165-5167.

[57] C. D. Campbell, D. T. Cole and H. R. Taylor III, Process for the Preparation of Dialkyl Succinylsuccinates, U.S. Pat. No. 5,783,723, 1998.

[58] H. Lin, Y.-D. Huang and F. Wang, *Int. J. Mol. Sci.*, 2008, 9, 2159-2168.

[59] S. Henke, A. Schneemann, S. Kapoor, R. Winter and A. Fischer, *J. Mater Chem.*, 2012, 22, 909-918.

[60] H.-L. Liu and Q.-Z. Wang, *Asian J. Chem.*, 2014, 26, 5165-5167.

[61] Y.-F. Liang, S. Song, L. Ai, X. Li and N. Jiao, *Green Chem.*, 2016, 18, 6462-6467.

[62] Z. Y. Chen and W. Zhang, *Chin. Chem. Lett.*, 2007, 18, 1443-1446.

[63] R. Albilali and N. Dimitratos, *Catal. Lett.*, 2017, 147, 2372-2384.

[64] F.-S. Tjoeng and G. A. Heavner, *J. Org. Chem.*, 1983, 48, 355-359.

[65] M. Ritsuki, K. Ohmori, L. Hintermann, S. Yoshida and K. Suzuki, *Angew. Chem. Int. Ed.*, 2009, 48, 3462-3465.

[66] H. Lin, Y.-D. Huang and F. Wang, *Int. J. Mol. Sci.*, 2008, 9, 2159-2168.

[67] S. Henke, A. Schneemann, S. Kapoor, R. Winter and A. Fischer, *J. Mater Chem.*, 2012, 22, 909-918.

[68] Y.-F. Chen, E. M. Woo, and S.-H. Li, *Langmuir*, 2008, 24, 11880-11888.

[69] M. G. Koehler and A. J. Hopfinger, *Polymer*, 1989, 30, 116-126.

[70] B. Wunderlich, "Copolymer and Isomer Melting" in *Macromolecular Physics Volume 3 Crystal Melting*, Academic Press, New York, 1980, 10, 312-314.

What is claimed is:

1. A polymer comprising a plurality of monomers having the structure:

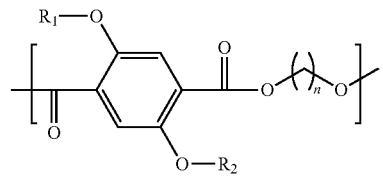

wherein n may be from 1 to 20, and wherein $R_1$ and $R_2$ may be independently selected from hydrogen or a $C_1$-$C_6$ hydrocarbon subtituent.

2. The polymer according to claim 1, wherein the polymer is a copolymer, possessing additional repeat units.

3. The polymer according to claim 1, wherein the polymer is a polyalkylene dihydroxyterephthalate, having the structure:

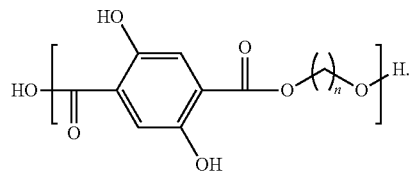

4. The polymer according to claim 3, wherein the polymer has a number average molecular weight in a range of from about 5,000 to about 500,000.

5. The polymer according to claim 3, wherein the polymer has a weight average molecular weight in a range of from about 10,000 to about 1,000,000.

6. The polymer according to claim 3, wherein the polymer has a dispersity in a range of from about 1.1 to about 10.

7. The polymer according to claim 3, wherein the polymer has a glass transition temperature in a range of from about 30 to about 180° C.

8. The polymer according to claim 1, wherein the polymer is a polyalkylene dimethoxyterephthalate, having the structure:

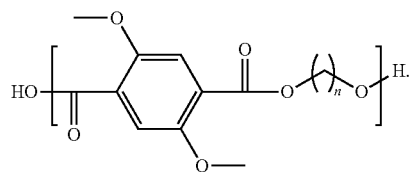

9. The polymer according to claim 8, wherein the polymer has a number average molecular weight in a range of from about 5,000 to about 500,000.

10. The polymer according to claim 8, wherein the polymer has a weight average molecular weight in a range of from about 10,000 to about 1,000,000.

11. The polymer according to claim 8, wherein the polymer has a dispersity in a range of from about 1.1 to about 10.

12. The polymer according to claim 8, wherein the polymer has a glass transition temperature in a range of from about 5 to about 80° C.

13. A method for producing a polymer, comprising:
esterifying succinic acid to form dimethyl succinate;
dimerizing the dimethyl succinate to obtain dimethyl succinyl succinate;
aromatizing the dimethyl succinyl succinate via at least one selected from N-chlorosuccinimide oxidation, sulfuric acid oxidation, dimethylsulfoxide oxidation, hydrogen peroxide oxidation, and transfer dehydrogenation to produce dimethyl 2,5-dihydroxyterephthalate;
hydrolysing and optionally methylating the dimethyl 2,5-dihydroxyterephthalate to produce a monomer; and
polymerizing the monomer with a comonomer comprising at least 2 hydroxyl groups to produce the polymer.

14. The method according to claim 13, wherein the comonomer is a linear diol having the structure:

$HO(CH_2)_nOH$, wherein n is from 1 to 20.

* * * * *